(12) United States Patent
Wang

(10) Patent No.: US 11,967,176 B2
(45) Date of Patent: Apr. 23, 2024

(54) FACIAL RECOGNITION METHOD, FACIAL RECOGNITION SYSTEM, AND ELECTRONIC DEVICE

(71) Applicant: ZHEJIANG UNIVIEW TECHNOLOGIES CO., LTD., Zhejiang (CN)

(72) Inventor: Hui Wang, Zhejiang (CN)

(73) Assignee: ZHEJIANG UNVIEW TECHNOLOGIES CO., LTD., Zhejiang (CN)

( * ) Notice: Subject to any disclaimer, the term of this patent is extended or adjusted under 35 U.S.C. 154(b) by 522 days.

(21) Appl. No.: 17/268,127

(22) PCT Filed: Apr. 3, 2019

(86) PCT No.: PCT/CN2019/081186
§ 371 (c)(1),
(2) Date: Feb. 12, 2021

(87) PCT Pub. No.: WO2020/034645
PCT Pub. Date: Feb. 20, 2020

(65) Prior Publication Data
US 2021/0326622 A1  Oct. 21, 2021

(30) Foreign Application Priority Data
Aug. 13, 2018  (CN) .......................... 201810919221.7

(51) Int. Cl.
*G06V 40/16* (2022.01)
*G06F 18/22* (2023.01)

(52) U.S. Cl.
CPC ............ *G06V 40/168* (2022.01); *G06F 18/22* (2023.01); *G06V 40/171* (2022.01); *G06V 40/172* (2022.01)

(58) Field of Classification Search
CPC .. G06V 40/168; G06V 40/172; G06V 40/171; G06F 18/22
See application file for complete search history.

(56) References Cited

U.S. PATENT DOCUMENTS

| 2008/0317298 | A1 | 12/2008 | Shah et al. |
| 2016/0086047 | A1 | 3/2016 | Suh et al. |
| 2020/0159899 | A1* | 5/2020 | Maeno .................. H04L 9/3231 |

FOREIGN PATENT DOCUMENTS

| CN | 103400108 A | * 11/2013 | ......... G06K 9/00255 |
| CN | 103400108 A | 11/2013 | |

(Continued)

OTHER PUBLICATIONS

Extended European Search Report issued from the European Patent Office to EP Application No. 19849095.5 dated May 9, 2022, 7 pages.

(Continued)

*Primary Examiner* — Vu Le
*Assistant Examiner* — Tracy Mangialaschi
(74) *Attorney, Agent, or Firm* — Hunton Andrews Kurth LLP

(57) ABSTRACT

Provided are a facial recognition method, an electronic device, a computer-readable storage medium, and a facial recognition system. The facial recognition method includes: obtaining a first required comparison value and a second required comparison value based on a facial feature; if the first required comparison value is less than a preset comparison threshold and the second required comparison value is also less than the preset comparison threshold, re-extracting a facial feature, and matching the re-extracted facial feature against a plurality of original images separately to obtain a third required comparison value; and if the third required comparison value is greater than or equal to the (Continued)

preset comparison threshold, determining that the recognition is successful.

19 Claims, 4 Drawing Sheets

(56) References Cited

FOREIGN PATENT DOCUMENTS

| | | | | |
|---|---|---|---|---|
| CN | 204155293 U | * | 2/2015 | |
| CN | 105550671 A | | 5/2016 | |
| CN | 105574500 A | | 5/2016 | |
| CN | 106446816 A | * | 2/2017 | ......... G06K 9/00228 |
| CN | 106446816 A | | 2/2017 | |
| CN | 107437048 A | | 12/2017 | |
| CN | 107818308 A | | 3/2018 | |
| CN | 109145801 A | | 1/2019 | |
| EP | 2704052 A1 | | 3/2014 | |
| WO | 2015053438 A9 | | 4/2015 | |
| WO | WO-2019064743 A1 | * | 4/2019 | ............. G06F 21/32 |

OTHER PUBLICATIONS

China National Intellectual Property Administration, International Search Report issued in International application No. PCT/CN2019/081186; dated Jul. 4, 2019, 4 pages.

The State Intellectual Property Office of People's Republic of China, First Office Action issued in CN Application No. 201810919221.7; dated Apr. 24, 2020, 15 pages.

* cited by examiner

FACIAL RECOGNITION METHOD, FACIAL RECOGNITION SYSTEM, AND ELECTRONIC DEVICE

CROSS-REFERENCE TO RELATED APPLICATIONS

This application is a 35 U.S.C. § 371 United States national stage application of co-pending International Patent Application Number PCT/CN2019/081186, filed on Apr. 3, 2019, which claims priority to Chinese patent application No. 201810919221.7 filed Aug. 13, 2018, disclosures of which are incorporated herein by reference in their entireties.

TECHNICAL FIELD

The present disclosure relates to the technical field of facial recognition, for example, to a facial recognition method, a facial recognition system and an electronic device.

BACKGROUND

Facial recognition is an identity recognition technology based on a person's facial feature. In particular, the facial feature is extracted and compared against feature information that has been stored in a database, thus obtaining a result of comparison for identity recognition. Currently, however, the accuracy of facial recognition needs to be improved due to changes in a person's age, makeup, posture, or the like.

SUMMARY

In view of this, the present disclosure provides a facial recognition method, an electronic device, a computer-readable storage medium, and a facial recognition system.

The present disclosure provides a facial recognition method, and the method includes the following operations.

A facial image is captured, a facial feature is extracted, and the facial feature is matched against a plurality of pre-stored original images, separately, to obtain a first required comparison value. The facial feature is further matched against a plurality of pre-stored captured-on-site images, separately, to obtain a second required comparison value.

A determination is made as to whether the first required comparison value and the second required comparison value are greater than or equal to a preset comparison threshold is determined.

A facial feature is re-extracted in response to determining that the first required comparison value is less than the preset comparison threshold and the second required comparison value is also less than the preset comparison threshold. The re-extracted a facial feature is matched against matched against the plurality of original images, separately, to obtain a third required comparison value, and a determination is made regarding whether the third required comparison value is greater than or equal to the preset comparison threshold.

The facial image is saved as a new captured-on-site image in response to determining that the third required comparison value is greater than or equal to the preset comparison threshold, a number of successful comparisons of a captured-on-site image is refreshed, and recognition is determined as successful.

The present disclosure further provides an electronic device. The electronic device includes at least one processor and a memory.

The memory is configured to store at least one computer program.

The at least one computer program when executed by the at least one processor causes the at least one processor to perform the method described above.

The present disclosure further provides a computer-readable storage medium configured to store computer-executable instructions for executing the method described above.

The present disclosure further provides a facial recognition system including an image capture device and an electronic device, where the image capture device is communicatively coupled to the electronic device.

The image capture device is configured to capture a facial image and transmit the facial image to the electronic device.

The electronic device is the electronic device described above.

REFERENCE SIGNS

Figure 1:
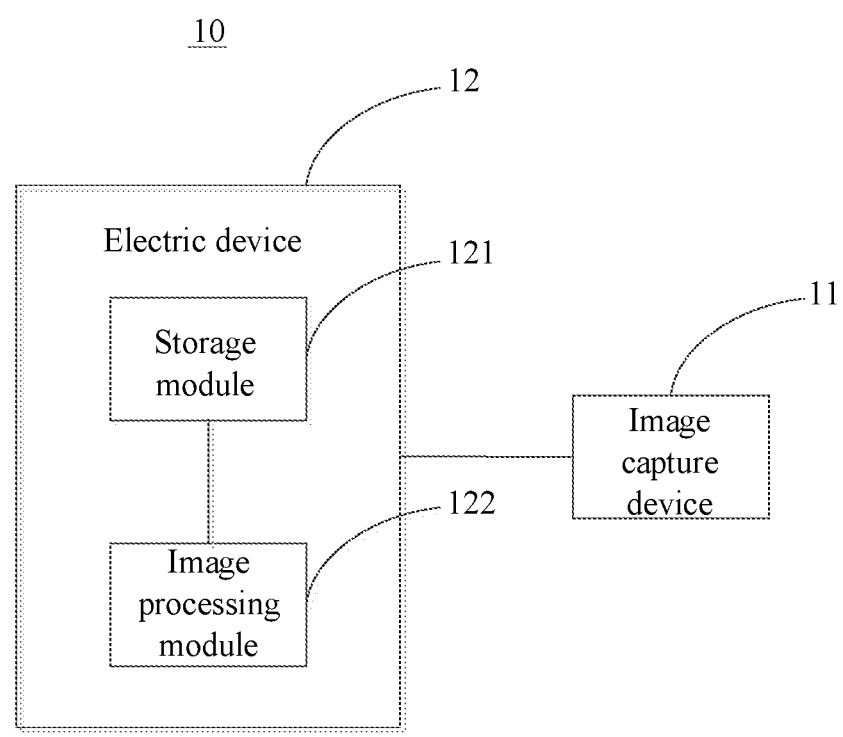
FIG. 1 is a schematic diagram of a facial recognition system according to the present disclosure.

10 Facial recognition system
11 Image capture device
12 Electronic device
121 Memory
122 Image processing module

DETAILED DESCRIPTION

Currently, facial recognition is needed for verifying people's identity in many occasions. Generally, due to a person's aging, makeup, and posture, omission of matching or false matching in facial recognition may happen during the process of capturing a facial image and matching the facial image against original images stored in a database, resulting in a decreased accuracy of facial recognition.

The present disclosure provides a facial recognition method, and the method includes steps described below.

A facial image is captured, a facial feature is extracted, and the facial feature is matched against a plurality of pre-stored original images, separately, to obtain a first required comparison value. The facial feature is matched against a plurality of pre-stored captured-on-site images, separately, to obtain a second required comparison value.

A determination is made as to whether the first required comparison value and the second required comparison value are greater than or equal to a preset comparison threshold.

A facial feature is re-extracted in response to determining that the first required comparison value is less than the preset comparison threshold and the second required comparison value is also less than the preset comparison threshold. The re-extracted a facial feature is matched against the plurality of original images, separately, to obtain a third required comparison value, and a determination is made as to whether the third required comparison value is greater than or equal to the preset comparison threshold.

The facial image is saved as a new captured-on-site image in response to determining that the third required comparison value is greater than or equal to the preset comparison threshold, a number of successful comparisons of a captured-on-site image is refreshed, and recognition is determined to be successful.

In one embodiment, the method further includes a step of in response to determining that the third required comparison value is less than the preset comparison threshold, determining that comparison is unsuccessful and the recognition is failed.

In one embodiment, the method further includes steps described below.

A determination is made as to whether an original image corresponding to the first required comparison value and a captured-on-site image corresponding to the second required comparison value are images of a same person in response to determining that the first required comparison value is greater than or equal to the preset comparison threshold.

A comparison is determined to be successful and recognition is determined to pass in response to determining that the first required comparison value is greater than or equal to the preset comparison threshold and the original image corresponding to the first required comparison value and the captured-on-site image corresponding to the second required comparison value are the images of the same person.

In one embodiment, the method further includes steps described below.

A determination is made as to whether the second required comparison value is greater than or equal to the preset comparison threshold is determined in response to determining that the first required comparison value is greater than or equal to the preset comparison threshold and an original image corresponding to the first required comparison value and a captured-on-site image corresponding to the second required comparison value are not images of a same person.

A comparison is determined to be successful and recognition is determined to pass in response to determining that the second required comparison value is less than the preset comparison threshold.

In one embodiment, after the step of determining, in response to determining that the first required comparison value is greater than or equal to the preset comparison threshold and the original image corresponding to the first required comparison value and the captured-on-site image corresponding to the second required comparison value are not images of the same person, whether the second required comparison value is greater than or equal to the preset comparison threshold, the method further includes steps described below.

A determination is made as to whether the person corresponding to the original image corresponding to the first required comparison value is present in a pre-stored approximate mismatch database is determined in response to determining that the second required comparison value is greater than or equal to the preset comparison threshold.

A determination is made as to whether a number of successful comparisons of the captured-on-site image corresponding to the second required comparison value is greater than or equal to two is determined in response to determining that the person corresponding to the original image corresponding to the first required comparison value is in the approximate mismatch database. A comparison is determined to be successful and recognition is determined to pass in response to determining that the number of successful comparisons of the captured-on-site image corresponding to the second required comparison value is greater than or equal to two.

In one embodiment, the method further includes steps described below.

A facial feature is re-extracted in response to determining that the number of successful comparisons of the captured-on-site image corresponding to the second required comparison value is less than two, and the re-extracted a facial feature is compared with the captured-on-site image corresponding to the second required comparison value again.

A comparison is determined to be successful in response to determining that a comparison value obtained by comparing the re-extracted facial feature with the captured-on-site image corresponding to the second required comparison value is greater than or equal to the preset comparison threshold. The number of successful comparisons of the captured-on-site image corresponding to the second required comparison value is refreshed, and recognition is determined to pass.

In one embodiment, after the step of re-extracting, in response to determining that the number of successful comparisons of the captured-on-site image corresponding to the second required comparison value is less than two, the facial feature, and comparing the re-extracted facial feature with the captured-on-site image corresponding to the second required comparison value again, the method further includes a step described below.

The comparison is determined to be unsuccessful in response to determining that the comparison value obtained by comparing the re-extracted facial feature with the captured-on-site image corresponding to the second required comparison value is less than the preset comparison threshold. The number of successful comparisons of the captured-on-site image corresponding to the second required comparison value is removed, the second required comparison value is deleted, and the recognition is determined fail.

In one embodiment, the method further includes steps described below.

A facial feature is re-extracted in response to determining that the person corresponding to the original image corresponding to the first required comparison value is not present in the approximate mismatch database, and the re-extracted a facial feature is matched against the plurality of original images to obtain a fourth required comparison value.

A comparison is determined to be successful and recognition is determined to pass in response to determining that the fourth required comparison value is greater than or equal to the preset comparison threshold.

In one embodiment, the method further includes steps described below.

The comparison is determined to be unsuccessful and the recognition is determined fail in response to determining that the fourth required comparison value is less than the preset comparison threshold.

In one embodiment, the method further includes steps described below.

A determination is made as to whether a number of successful comparisons of a captured-on-site image corresponding to the second required comparison value is greater than or equal to two is determined in response to determining that the first required comparison value is less than the preset comparison threshold and the second required comparison value is greater than or equal to the preset comparison threshold.

A comparison is determined to be successful and recognition is determined to pass in response to determining that the number of successful comparisons of the captured-on-site image corresponding to the second required comparison value is greater than or equal to two.

In one embodiment, the method further includes a step described below. A facial feature is re-extracted in response to determining that the number of successful comparisons of the captured-on-site image corresponding to the second required comparison value is less than two, and the re-extracted a facial feature is compared with the captured-on-site image corresponding to the second required comparison value.

The comparison is determined to be successful based on that a comparison value obtained by comparing the re-extracted facial feature with the captured-on-site image corresponding to the second required comparison value is greater than or equal to the preset comparison threshold, the number of successful comparisons of the captured-on-site image corresponding to the second required comparison value is refreshed, and the recognition is determined to pass.

In one embodiment, the method further includes steps described below.

The comparison is determined to be unsuccessful in response to determining that the comparison value obtained by comparing the re-extracted facial feature with the captured-on-site image corresponding to the second required comparison value is less than the preset comparison threshold, the number of successful comparisons of the captured-on-site image corresponding to the second required comparison value is removed, the second required comparison value is deleted, and the recognition is determined fail.

In one embodiment, the step of obtaining the facial image, extracting the facial feature, and matching the facial feature against the plurality of pre-stored original images, separately, to obtain the first required comparison value; and matching the facial feature against the plurality of pre-stored captured-on-site images, separately, to obtain the second required comparison value includes steps described below.

It is determined whether there is a face to be recognized. The facial feature is extracted in response to determining that there is a face to be recognized, and the facial feature is compared with the plurality of pre-stored original images, separately, to obtain the first required comparison value. The facial feature is compared with the plurality of pre-stored captured-on-site images, separately, to obtain the second required comparison value.

Referring to FIG. 1, FIG. 1 is a schematic diagram of a facial recognition system 10 according to the present disclosure. The facial recognition system 10 may be applied to an access control system. The facial recognition system 10 includes an image capture device 11 and an electronic device 12. The electronic device 12 includes a memory 121 and at least one processor, and each of the at least one processor may specifically include an image processing module 122. The image capture device 11 is communicatively coupled to the electronic device 12. The image capture device 11 is configured to acquire a facial image and transmit the captured facial image to the electronic device 12.

The memory 121 stores computer programs which can be executed on the image processing module 122, and when the image processing module 122 executes the computer programs, the electronic device 12 is enabled to implement the facial recognition method described below.

Figure 2:
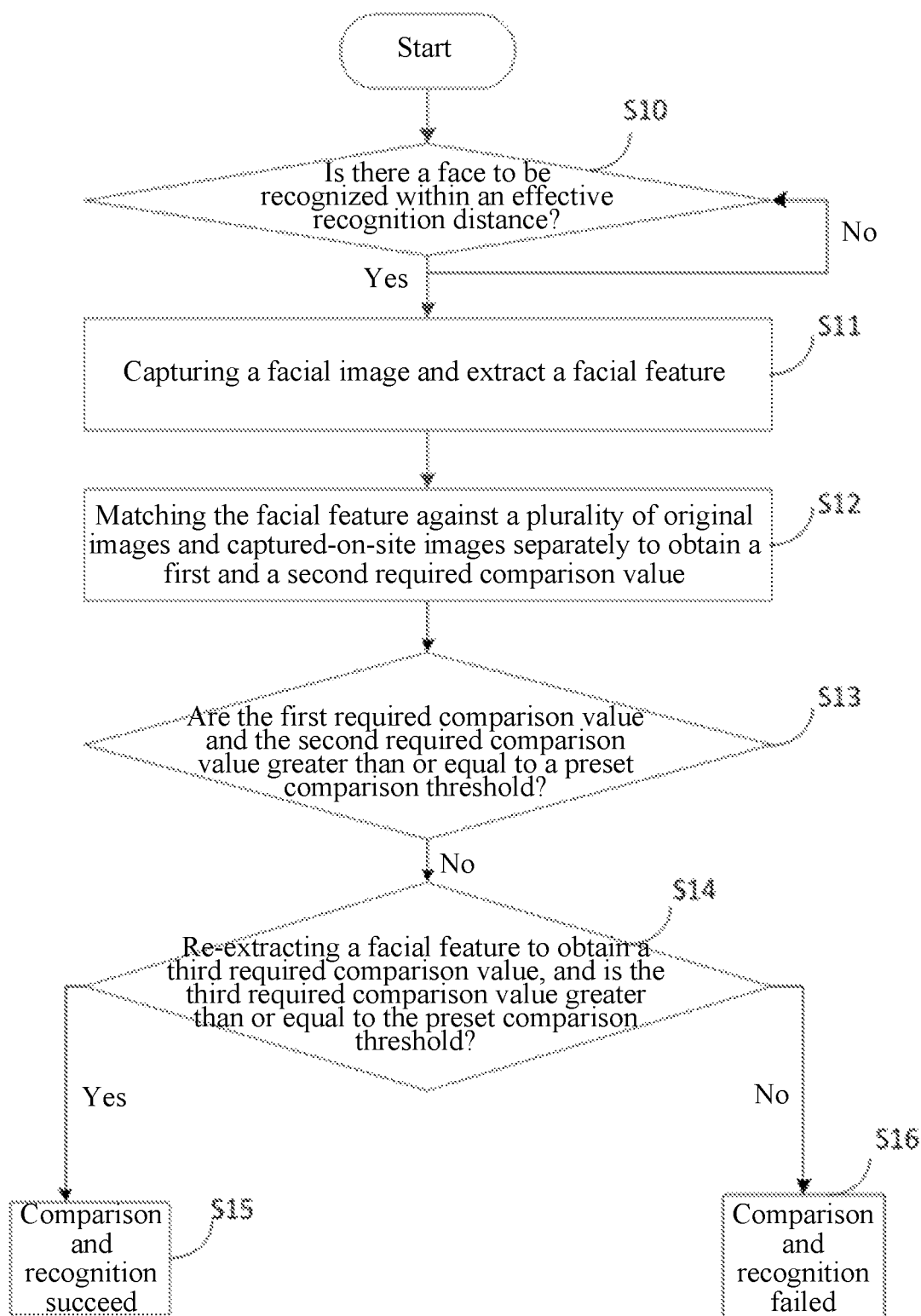
FIG. 2 is a flowchart of a facial recognition method according to the present disclosure.

Referring to FIG. 2 in conjunction, FIG. 2 is a flowchart of a facial recognition method according to the present disclosure. This method can be applied to the facial recognition system 10 shown in FIG. 1 and executed by the electronic device 12 in the facial recognition system 10.

The method may be applied to the electronic device 12, and the electronic device 12 pre-stores original images of a plurality of persons, captured-on-site images of the plurality of persons, and a number of successful comparisons based on each captured-on-site image. The method may include steps described below.

In step S10, whether there is a face to be recognized within an effective recognition distance is detected, and if there is a face to be recognized, step S11 to step S14 are executed. If no face to be recognized exists, step S10 is returned and executed.

In step S11, a facial image is captured and a facial feature is extracted.

In step S12, the facial feature is compared with a plurality of original images, separately, to obtain a first required comparison value; and the facial feature is compared with a plurality of captured-on-site images, separately, to obtain a second required comparison value.

The facial feature is matched against the plurality of original images to obtain a plurality of comparison values, and in the obtained plurality of comparison values, a highest comparison value is the first required comparison value. Similarly, the facial feature is compared with the plurality of captured-on-site images to obtain a plurality of comparison values, and in the obtained plurality of comparison values, a highest comparison value is the second required comparison value. The higher the comparison value, the higher the similarity between the captured facial image and the original image and the captured-on-site image.

In step S13, whether the first required comparison value and the second required comparison value are greater than or equal to a preset comparison threshold is determined, if the first required comparison value is less than the preset comparison threshold and the second required comparison value is also less than the preset comparison threshold, step S14 is executed.

In step S14, a facial feature is re-extracted, the re-extracted a facial feature is matched against the plurality of original images, separately, to obtain a third required comparison value, and whether the third required comparison value is greater than or equal to the preset comparison threshold is determined; and if the third required comparison value is greater than or equal to the preset comparison threshold, step S15 is executed, and if the third required comparison value is less than the preset comparison threshold, step S16 is executed.

In step S15, the facial image is stored in the electronic device 12 as a new captured-on-site image, a number of successful comparisons of a captured-on-site image is refreshed, and recognition is determined to pass.

In a case where the first required comparison value is less than the preset comparison threshold and the second required comparison value is also less than the preset comparison threshold, the facial feature is re-extracted and facial recognition is performed again, the re-extracted a facial feature is different from the facial feature extracted before, the re-extracted facial feature can be more refining compared with the facial feature extracted before, and accuracy of the re-extracted facial feature can be higher.

In one embodiment, when the captured facial image is stored in the electronic device 12 as the new captured-on-site image, the new captured-on-site image is not stored in a database, and in next facial recognition, after a next comparison is performed, only a new captured-on-site image that the comparison is successful and the recognition is successful will be stored in the database. In this way, after multiple verifications and comparisons, the captured-on-site image is more adaptable in a facial recognition process.

In order to improve accuracy of the facial recognition, when the captured facial image is stored in the electronic device 12 as the new captured-on-site image, whether the captured facial image satisfies a preset condition may further be determined. A facial image that enables the comparison to be successful and satisfies the preset condition is stored in the electronic device 12 as the new captured-on-site image. If the electronic device 12 stores a captured-on-site image, the captured-on-site image is replaced.

In a specific implementation, the plurality of captured-on-site images stored in the electronic device 12 may correspond to different persons, that is, at most one image of each person is stored in the electronic device 12. If the electronic device 12 stores a captured-on-site image of a same person as the new captured-on-site image, the captured-on-site image may be replaced by the new captured-on-site image to achieve the replacement processing.

The preset condition includes at least one of: determining whether quality of the captured facial image satisfies a preset threshold for storing the captured-on-site image in the database, and determining whether a distance of a captured face is within a preset distance range. Distance detection of the captured face can predict a distance to the face through a size of the captured face or a geometric space model.

In one embodiment, a process of determining whether the preset condition is satisfied may include steps described below. If the quality of the captured facial image satisfies a threshold for storing the captured-on-site image in the database, and the distance of the captured face is within the preset distance range, the comparison is successful. The captured facial image is stored in the electronic device 12 as the new captured-on-site image, the number of successful comparisons based on the new captured-on-site image is refreshed, and the recognition is determined to pass.

In one embodiment, the process of determining whether the preset condition is satisfied may include a step described below. If the quality of the captured facial image satisfies the threshold for storing the captured-on-site image in the database, the comparison is successful and the recognition is determined to pass. In one embodiment, the process of determining whether the preset condition is satisfied may include a step described below. If the distance of the captured face is within the preset distance range, the comparison is successful and the recognition is determined to pass. In one embodiment, the process of determining whether the preset condition is satisfied may include a step described below. If the quality of the captured facial image does not satisfy the threshold for storing the captured-on-site image in the database and the distance of the captured face is not within the preset distance range, the comparison is unsuccessful and the recognition is determined fail.

It is to be noted that in step S15 of this embodiment, the step of refreshing the number of successful comparisons of the captured-on-site image specifically is refreshing the number of successful comparisons of the new captured-on-site image.

In other embodiments, the step of refreshing the number of successful comparisons of the captured-on-site image specifically may be refreshing a number of successful comparisons of a target captured-on-site image in the plurality of pre-stored captured-on-site images. The target captured-on-site image may be a captured-on-site image corresponding to the second required comparison value. The target captured-on-site image may be a captured-on-site image that can be successfully compared with the new captured-on-site image. The target captured-on-site image may be an image of a same person as the new captured-on-site image.

In step S16, the comparison is unsuccessful and the recognition is failed.

Figure 3:
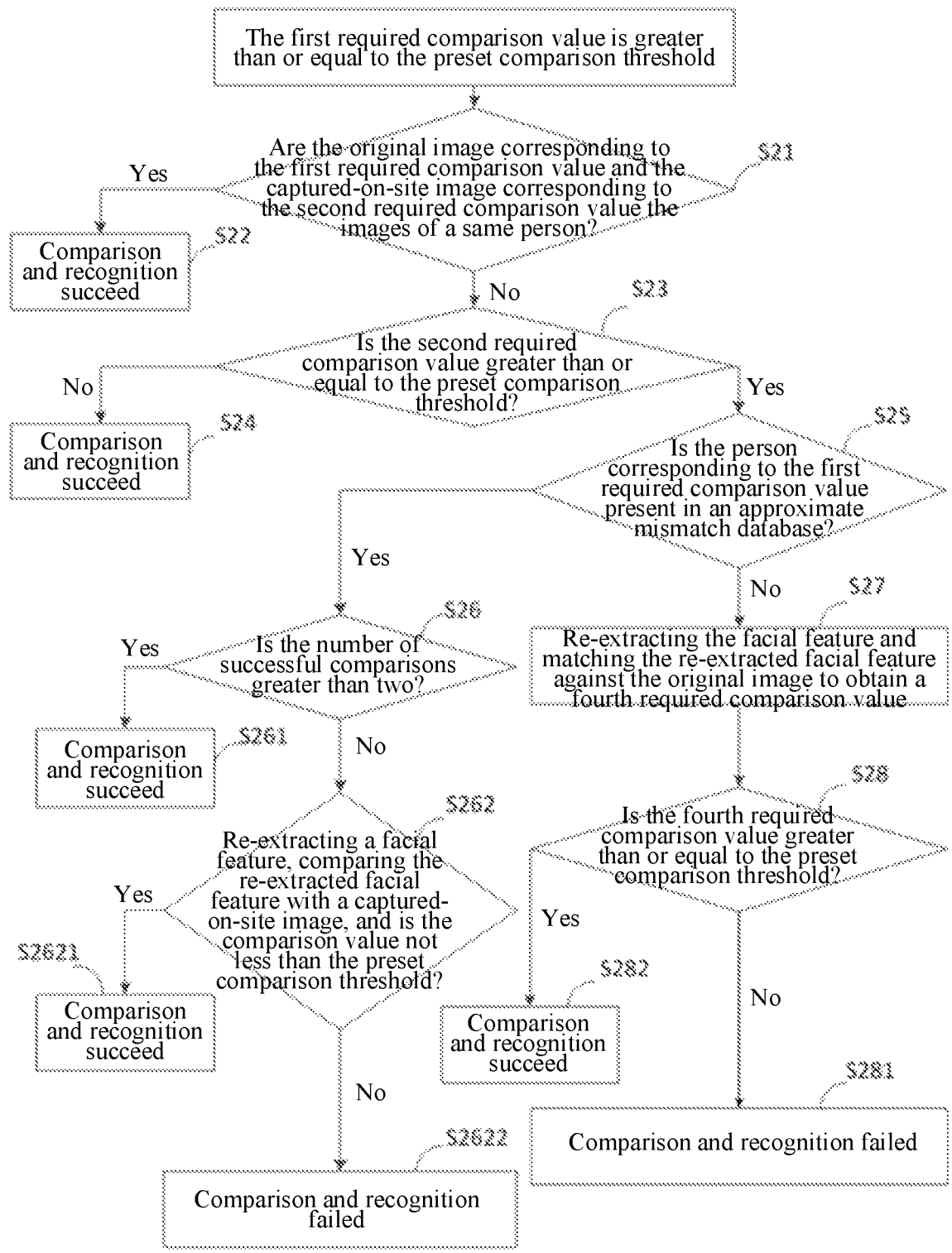
FIG. 3 is another flowchart of a facial recognition method according to the present disclosure.

Referring to FIG. 3 in conjunction, the electronic device 12 may store an approximate mismatch database, and the approximate mismatch database stores a list of similar personnel. If the first required comparison value is greater than or equal to the preset comparison threshold, step S21 is executed.

In step S21, whether an original image corresponding to the first required comparison value and a captured-on-site image corresponding to the second required comparison value are images of a same person is determined; if the first required comparison value is greater than or equal to the preset comparison threshold and the original image corresponding to the first required comparison value and the captured-on-site image corresponding to the second required comparison value are the images of the same person, step S22 is executed; and if the first required comparison value is greater than or equal to the preset comparison threshold and the original image corresponding to the first required comparison value and the captured-on-site image corresponding to the second required comparison value are not images of the same person, step S23 is executed.

In step S22, the comparison is successful and the recognition is successful.

After determining that the recognition is successful, the first required comparison value is stored in the electronic device 12 as a record of determining the recognition is successful.

In step S23, whether the second required comparison value is greater than or equal to the preset comparison threshold is determined; if the second required comparison value is less than the preset comparison threshold, step S24 is executed; and if the second required comparison value is greater than or equal to the preset comparison threshold, step S25 is executed.

In step S24, the comparison is successful and the recognition is successful.

After determining that the recognition is successful, the first required comparison value is stored in the electronic device 12 as a record of determining the recognition is successful.

In step S25, whether a person corresponding to the original image corresponding to the first required comparison value is in the approximate mismatch database is determined; if the person corresponding to the original image corresponding to the first required comparison value is in the approximate mismatch database, step S26 is executed; and if the person corresponding to the original image corresponding to the first required comparison value is not present in the approximate mismatch database, step S27 and step S28 are executed.

In step S26, whether a number of successful comparisons of the captured-on-site image corresponding to the second required comparison value is greater than two (that is, greater than or equal to two) is determined; if the number of successful comparisons of the captured-on-site image corresponding to the second required comparison value is two or more, step S261 is executed; and if the number of successful comparisons of the captured-on-site image corresponding to the second required comparison value is one or less (that is, less than two), step S262 is executed.

In step S261, the comparison is successful and the recognition is successful.

After determining that the recognition is successful, the second required comparison value is stored in the electronic device 12 as a record of determining the recognition is successful.

In step S262, a facial feature is re-extracted, the re-extracted a facial feature is compared with the captured-on-site image corresponding to the second required comparison value again, and whether a comparison value obtained by comparing the re-extracted facial feature with the captured-on-site image corresponding to the second required comparison value is greater than or equal to the preset comparison threshold is determined; if the comparison value obtained by comparing the re-extracted facial feature with the captured-on-site image corresponding to the second required comparison value is greater than or equal to the preset comparison threshold, step S2621 is executed; and if the comparison value obtained by comparing the re-extracted facial feature with the captured-on-site image corresponding to the second required comparison value is less than the preset comparison threshold, step S2622 is executed.

In step S2621, the comparison is successful, the number of successful comparisons of the captured-on-site image corresponding to the second required comparison value is refreshed, and the recognition is determined to pass.

After determining that the recognition is successful, the comparison value is taken as a record of determining the recognition is successful, the number of successful comparisons of the captured-on-site image corresponding to the second required comparison value after refreshing and the record of determining the recognition is successful are stored in the electronic device 12.

In step S2622, the comparison is unsuccessful, the number of successful comparisons of the captured-on-site image corresponding to the second required comparison value is removed, the second required comparison value is deleted, and the recognition is determined fail.

In the embodiment shown in FIG. 3, the method further includes step S27. In step S27, a facial feature is re-extracted, and the re-extracted a facial feature is matched against the plurality of original images to obtain a fourth required comparison value.

In step S28, whether the fourth required comparison value is greater than or equal to the preset comparison threshold is determined; if the fourth required comparison value is less than the preset comparison threshold, step S281 is executed; and if the fourth required comparison value is greater than or equal to the preset comparison threshold, step S282 is executed.

In step S281, the comparison is unsuccessful, the number of successful comparisons of the captured-on-site image corresponding to the second required comparison value is removed, the second required comparison value is deleted, and the recognition is determined fail.

In step S282, the comparison is successful and the recognition is successful.

If the fourth required comparison value is greater than or equal to the preset comparison threshold, the comparison is successful, and after determining that the recognition is successful, if an original image corresponding to the fourth required comparison value and the original image corresponding to the first required comparison value are images of a same person, the first required comparison value is taken as a record of determining that the recognition is successful and stored in a server. The number of successful comparisons of the captured-on-site image corresponding to the second required comparison value is removed, and the second required comparison value is deleted. If the original image corresponding to the fourth required comparison value and the captured-on-site image corresponding to the second required comparison value are images of a same person, a personnel list corresponding to the original image corresponding to the first required comparison value and a personnel list corresponding to the captured-on-site image corresponding to the second required comparison value are stored in the approximate mismatch database, and the second required comparison value is stored in the electronic device 12 as a record of determining that the recognition is successful. If the original image corresponding to the fourth required comparison value and the original image corresponding to the first required comparison value are not images of a same person and the original image corresponding to the fourth required comparison value and the captured-on-site image corresponding to the second required comparison value are not images of a same person, the fourth required comparison value is stored in the electronic device 12 as a record of determining that the recognition is successful, the number of successful comparisons of the captured-on-site image corresponding to the second required comparison value is removed, and the second required comparison value is deleted.

Figure 4:
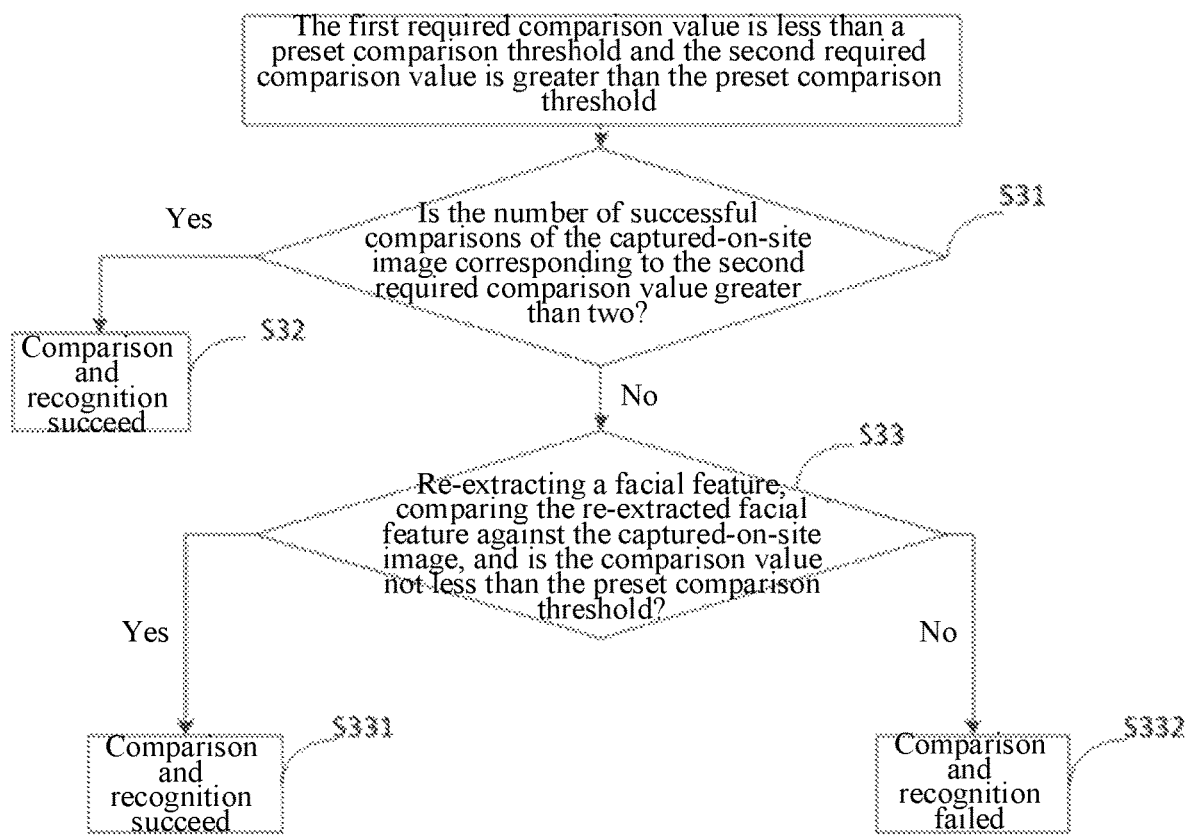
FIG. 4 is another flowchart of a facial recognition method according to the present disclosure.

In conjunction with and referring to FIG. 4, if the first required comparison value is less than the preset comparison threshold and the second required comparison value is greater than or equal to the preset comparison threshold, step S31 is executed.

In step S31, whether the number of successful comparisons of the captured-on-site image corresponding to the second required comparison value is greater than two is determined; if the number of successful comparisons of the captured-on-site image corresponding to the second required comparison value is two or more (that is, greater than or equal to two), step S32 is executed; and if the number of successful comparisons of the captured-on-site image corresponding to the second required comparison value is one or less (that is, less than two), step S33 is executed.

In step S32, the comparison is successful and the recognition is successful.

After determining that the recognition is successful, the second required comparison value is stored in the electronic device 12 as a record of determining the recognition is successful.

In step S33, a facial feature is re-extracted, the re-extracted a facial feature is compared with the captured-on-site image corresponding to the second required comparison value, and whether a comparison value obtained by comparing the re-extracted facial feature with the captured-on-site image corresponding to the second required comparison value is greater than or equal to the preset comparison threshold is determined; if the comparison value obtained by comparing the re-extracted facial feature with the captured-on-site image corresponding to the second required comparison value is greater than or equal to the preset comparison threshold, step S331 is executed; and if the comparison value obtained by comparing the re-extracted facial feature with the captured-on-site image corresponding to the second required comparison value is less than the preset comparison threshold, step S332 is executed.

In step S331, the comparison is successful, the number of successful comparisons of the captured-on-site image corresponding to the second required comparison value is refreshed, and the recognition is determined to pass.

After determining that the recognition is successful, the comparison value is taken as a record of determining the recognition is successful, the number of successful comparisons of the captured-on-site image corresponding to the second required comparison value after refreshing and the record of determining the recognition is successful are stored in the electronic device 12.

In step S332, the comparison is unsuccessful, the number of successful comparisons of the captured-on-site image corresponding to the second required comparison value is removed, the second required comparison value is deleted, and the recognition is determined fail.

In the above-mentioned process, the comparison is successful, the number of successful comparisons of the captured-on-site image corresponding to the second required comparison value is refreshed, and the number of successful comparisons is added to the original number of successful comparisons. For example, if the original number of successful comparisons is one, and after refreshing, the number of successful comparisons is added to 1, and thereby the number of successful comparisons is changed to two.

The comparison is unsuccessful, and the number of successful comparisons of the captured-on-site image corresponding to the second required comparison value is removed. For example, the number of successful comparisons of the captured-on-site image is one, after the comparison is unsuccessful, the one is changed to zero, that is, an initialization state, the comparison value (that is, the second required comparison value) obtained by comparing the extracted face with the captured-on-site image is deleted, and the recognition is determined to fail.

In order to ensure the accuracy of facial recognition, the captured-on-site images stored in the electronic device 12 are continuously updated. An update mode may be that in the process of facial recognition, a face acquisition image satisfying the preset condition is taken as a new captured-on-site image to replace an existing captured-on-site image and stored in the electronic device 12; or may be that in the process of facial recognition, a facial image satisfying the preset condition is periodically captured, and the facial image is taken as a new captured-on-site image and stored in the electronic device 12 so as to update the captured-on-site image in the electronic device 12. Moreover, original images stored in the electronic device 12 may be updated by periodically inputting new images.

The present disclosure provides a facial recognition system 10 applied to an access control system. The facial recognition system 10 includes an image capture device 1 and an electronic device 12, and the image capture device 11 is communicatively coupled to the electronic device 12.

The image capture device 11 is configured to acquire a facial image and transmit the facial image to the electronic device 12.

The electronic device 12 includes a memory 121, a processor (the processor may be an image processing module 122), and computer programs that are stored in the memory 121 and that can be executed on the processor. When the processor executes the computer programs, the electronic device 12 in the facial recognition system 10 is enabled to perform the above-mentioned facial recognition method.

In one embodiment, the memory 121 includes a personnel database, and the personnel database stores original images of a plurality of persons and captured-on-site images of the plurality of persons.

The image processing module 122 is configured to extract a facial feature in the facial image, and match the extracted facial feature against the plurality of original images and the plurality of captured-on-site images, separately, to recognize the facial image.

For example, when the facial recognition system 10 provided by the present disclosure is applied to the access control system, the electronic device 12 may be a terminal device disposed on the access control system. The terminal device detects passing people in real time, acquires facial images, extracts facial feature and performs the facial recognition on pedestrians to pass through the access control system. When the facial recognition is successful, the terminal device controls a gate to open, and a pedestrian can pass through the gate. When the pedestrian passes through the gate, the gate will automatically close after a period of delay and continue to detect a next pedestrian. When the facial recognition system 10 is applied to the access control system, there will be safety risks if the gate opens when the pedestrian is too far away from the gate. For example, other pedestrians enter the gate first. Therefore, the terminal device further needs to detect a distance between the gate and the face, and only when the face is within an appropriate distance range, will the gate be opened allowing the pedestrian to pass through. Optionally, the distance range is set to 0.3 to 1.5 m in the present disclosure. In one embodiment, when the facial recognition system 10 is applied to the access control system, the terminal device defines two distance modes including a fast mode and a safe mode, where a distance threshold of the fast mode is greater than a distance threshold of the safe mode. When the fast mode is enabled, it is detected that the distance to the face is less than or equal to the distance threshold of the fast mode, and facial recognition comparison and verification process is started. When the safe mode will be enabled and it is detected that the distance to the face is less than or equal to the distance threshold of the safe mode, the facial recognition comparison verification process will be started.

It is clear to those skilled in the art that for the convenience and simplicity of the description, a specific working process of the above-mentioned facial recognition system 10 may refer to a corresponding process in the aforementioned method and will not be repeated herein.

To sum up, in the facial recognition method and the facial recognition system provided by the present disclosure, the electronic device stores the original images of the plurality of persons and the captured-on-site images of the plurality of persons, the facial image is captured, the facial feature is extracted, and the extracted a facial feature is matched against the plurality of original images and the plurality of captured-on-site images, thus performing the facial recognition on the face. In a case where the comparison between the face and the original image and the comparison between the face and the captured-on-site image are both failed, more refining a facial feature is re-extracted and matched against the plurality of original images in the electronic device, thereby performing the facial recognition on the face again. In this way, a condition without missing matching or false matching in facial recognition may be ensured and accuracy of the face may be effectively guaranteed. At the same time, in the present disclosure, when the facial image is re-stored in the database as the new captured-on-site image, the new captured-on-site image may need to be compared and verified multiple times so as to ensure that the new captured-on-site image may have strong adaptability, which may be beneficial to improving the accuracy of facial recognition.

An embodiment of the present disclosure further provides a computer-readable storage medium configured to store computer-executable instructions for executing the method described above.

All or part of the processes in the methods of the above-mentioned embodiments may be implemented by related hardware executed by computer programs, these programs may be stored in a non-transient computer-readable storage medium, and during the execution of these programs, the processes in the above-mentioned method embodiments may be performed. The non-transient computer-readable storage medium may be a magnetic disk, an optical disk, a read-only memory (ROM) or a random access memory (RAM).

What is claimed is:

1. A facial recognition method, comprising:
    capturing a facial image, extracting a facial feature, matching the facial feature against a plurality of pre-stored original images separately to obtain a first required comparison value, and matching the facial feature against a plurality of pre-stored captured-on-site images separately to obtain a second required comparison value;
    determining whether the first required comparison value and the second required comparison value are greater than or equal to a preset comparison threshold;
    in response to determining that the first required comparison value is less than the preset comparison threshold and the second required comparison value is also less than the preset comparison threshold, re-extracting a facial feature, matching the re-extracted facial feature against the plurality of original images separately to obtain a third required comparison value, and determining whether the third required comparison value is greater than or equal to the preset comparison threshold; and
    in response to determining that the third required comparison value is greater than or equal to the preset comparison threshold, saving the facial image as a new captured-on-site image for updating of the plurality of pre-stored captured-on-site images, refreshing a number of successful comparisons of the captured-on-site image, and determining that the recognition is successful.

2. The facial recognition method of claim 1, further comprising:
    in response to determining that the third required comparison value is less than the preset comparison threshold, determining that the comparison is unsuccessful and the recognition is failed.

3. The facial recognition method of claim 1, further comprising:
    in response to determining that the first required comparison value is greater than or equal to the preset comparison threshold, determining whether the original image corresponding to the first required comparison value and the captured-on-site image corresponding to the second required comparison value are images of a same person; and
    in response to determining that the first required comparison value is greater than or equal to the preset comparison threshold and the original image corresponding to the first required comparison value and the captured-on-site image corresponding to the second required comparison value are the images of the same person, determining that the comparison is successful and the recognition is successful.

4. The facial recognition method of claim 1, further comprising:
    in response to determining that the first required comparison value is greater than or equal to the preset comparison threshold and the original image corresponding to the first required comparison value and the captured-on-site image corresponding to the second required comparison value are not images of a same person, determining whether the second required comparison value is greater than or equal to the preset comparison threshold; and
    in response to determining that the second required comparison value is less than the preset comparison threshold, determining that the comparison is successful and recognition is successful.

5. The facial recognition method of claim 4, further comprising the following operations after the operation of in response to determining that the first required comparison value is greater than or equal to the preset comparison threshold and the original image corresponding to the first required comparison value and the captured-on-site image corresponding to the second required comparison value are not images of the same person, determining whether the second required comparison value is greater than or equal to the preset comparison threshold:
    in response to determining that the second required comparison value is greater than or equal to the preset comparison threshold, determining whether a person corresponding to the original image corresponding to the first required comparison value is present in a pre-stored approximate mismatch database; and
    in response to determining that the person corresponding to the original image corresponding to the first required comparison value is present in the approximate mismatch database, determining whether a number of successful comparisons of the captured-on-site image corresponding to the second required comparison value is greater than or equal to two; and in response to determining that the number of successful comparisons of the captured-on-site image corresponding to the second required comparison value is greater than or equal to two, determining that the comparison is successful and the recognition is successful.

6. The facial recognition method of claim 5, further comprising:
    in response to determining that the number of successful comparisons of the captured-on-site image corresponding to the second required comparison value is less than two, re-extracting a facial feature, and re-comparing the re-extracted facial feature against the captured-on-site image corresponding to the second required comparison value, and
    in response to determining that the comparison value obtained by comparing the re-extracted facial feature against the captured-on-site image corresponding to the second required comparison value is greater than or equal to the preset comparison threshold, determining that the comparison is successful, refreshing the number of successful comparisons of the captured-on-site image corresponding to the second required comparison value, and determining that the recognition is successful.

7. The facial recognition method of claim 6, further comprising the following operation subsequent to the operation of in response to determining that the number of successful comparisons of the captured-on-site image corresponding to the second required comparison value is less than two, re-extracting the facial feature, and re-comparing the re-extracted facial feature against the captured-on-site image corresponding to the second required comparison value:
  in response to determining that the comparison value obtained by comparing the re-extracted facial feature with the captured-on-site image corresponding to the second required comparison value is less than the preset comparison threshold, determining that the comparison is unsuccessful, removing the number of successful comparisons of the captured-on-site image corresponding to the second required comparison value, deleting the second required comparison value, and determining that the recognition is failed.

8. The facial recognition method of claim 5, further comprising:
  in response to determining that the person corresponding to the original image corresponding to the first required comparison value is not present in the approximate mismatch database, re-extracting a facial feature, and matching the re-extracted facial feature against the plurality of original images to obtain a fourth required comparison value; and
  in response to determining that the fourth required comparison value is greater than or equal to the preset comparison threshold, determining that a comparison is successful and recognition is successful.

9. The facial recognition method of claim 8, further comprising:
  in response to determining that the fourth required comparison value is less than the preset comparison threshold, determining that the comparison is unsuccessful and the recognition is failed.

10. The facial recognition method of claim 1, further comprising:
  in response to determining that the first required comparison value is less than the preset comparison threshold and the second required comparison value is greater than or equal to the preset comparison threshold, determining whether a number of successful comparisons of a captured-on-site image corresponding to the second required comparison value is greater than or equal to two; and
  in response to determining that the number of successful comparisons of the captured-on-site image corresponding to the second required comparison value is greater than or equal to two, determining that the comparison is successful and the recognition is successful.

11. The facial recognition method of claim 10, further comprising:
  in response to determining that the number of successful comparisons of the captured-on-site image corresponding to the second required comparison value is less than two, re-extracting a facial feature, and comparing the re-extracted facial feature against the captured-on-site image corresponding to the second required comparison value; and
  in response to determining that a comparison value obtained by comparing the re-extracted facial feature against the captured-on-site image corresponding to the second required comparison value is greater than or equal to the preset comparison threshold, determining that the comparison is successful, refreshing the number of successful comparisons of the captured-on-site image corresponding to the second required comparison value, and determining that the recognition is successful.

12. The facial recognition method of claim 11, further comprising:
  in response to determining that the comparison value obtained by comparing the re-extracted facial feature with the captured-on-site image corresponding to the second required comparison value is less than the preset comparison threshold, determining that the comparison is unsuccessful, removing the number of successful comparisons of the captured-on-site image corresponding to the second required comparison value, deleting the second required comparison value, and determining that the recognition is failed.

13. The facial recognition method of claim 1, wherein the operation of capturing the facial image, extracting the facial feature, and matching the facial feature against the plurality of pre-stored original images separately to obtain the first required comparison value; and matching the facial feature against the plurality of pre-stored captured-on-site images separately to obtain the second required comparison value comprises:
  detecting whether there is a face to be recognized, in response to determining that there is a face to be recognized, capturing the facial image, extracting the facial feature, and matching the facial feature against the plurality of pre-stored original images separately to obtain the first required comparison value; and matching the facial feature against the plurality of pre-stored captured-on-site images separately to obtain the second required comparison value.

14. An electronic device, comprising:
  at least one processor; and
  a memory configured to store at least one computer program;
  wherein the at least one computer program when executed by the at least one processor causes the at least one processor to perform the method of claim 1.

15. The electronic device of claim 14, wherein the memory comprises a personnel database, which is configured to store original images of a plurality of persons and captured-on-site images of the plurality of persons.

16. A non-transitory computer-readable storage medium, configured to store computer-executable instructions for executing the method of claim 1.

17. A facial recognition system, comprising an image capture device and an electronic device, wherein the image capture device is communicatively coupled to the electronic device,
  wherein the image capture device is configured to obtain a facial image and transmit the facial image to the electronic device; and
  the electronic device is the electronic device of claim 14.

18. The facial recognition system of claim 17, wherein
  the memory comprises a personnel database, which is configured to store original images of a plurality of persons and captured-on-site images of the plurality of persons; and
  the image processor is configured to extract a facial feature in the facial image, and match the extracted facial feature against the plurality of original images and the plurality of captured-on-site images separately for recognition.

19. The facial recognition system of claim 17, the facial recognition system being applied to an access control system.

* * * * *